United States Patent

[11] 3,539,155

[72] Inventor Edward A. Agranat
    Weston, Massachusetts
[21] Appl. No. 738,354
[22] Filed June 19, 1968
[45] Patented Nov. 10, 1970
[73] Assignee Amicon Corporation
    Lexington, Massachusetts
    a corporation of Massachusetts

[54] ULTRAFILTRATION BATCH CELL
    4 Claims, 1 Drawing Fig.
[52] U.S. Cl. .................................................. 259/8
[51] Int. Cl. .................................................. B01f 7/16
[50] Field of Search .......................................... 259/7, 8,
    Magnetic Stirrer, 107, 108, 23, 24, 43, 44, 102;
    210/415

[56] References Cited
UNITED STATES PATENTS
| | | | |
|---|---|---|---|
| 2,859,020 | 11/1958 | Eddy | 259/108 |
| 2,958,517 | 11/1960 | Harker | 259/108X |
| 3,245,665 | 4/1966 | Steel | 259/102X |

Primary Examiner—Robert W. Jenkins
Attorney—R. W. Furlong

ABSTRACT: A cell, suitable for use in ultrafiltration processes, which cell comprises an electromagnetic means for driving agitators in said cell and also comprises a novel construction whereby unfiltered liquid may be recovered from the cell by being discharged through a vertical conduit machined into the wall of the cell. The electromagnetic driving means can be employed in such a way as to stop agitation and signal the completion of, for example, a concentration step when contents of the cell reach a predetermined viscosity.

Patented Nov. 10, 1970
3,539,155
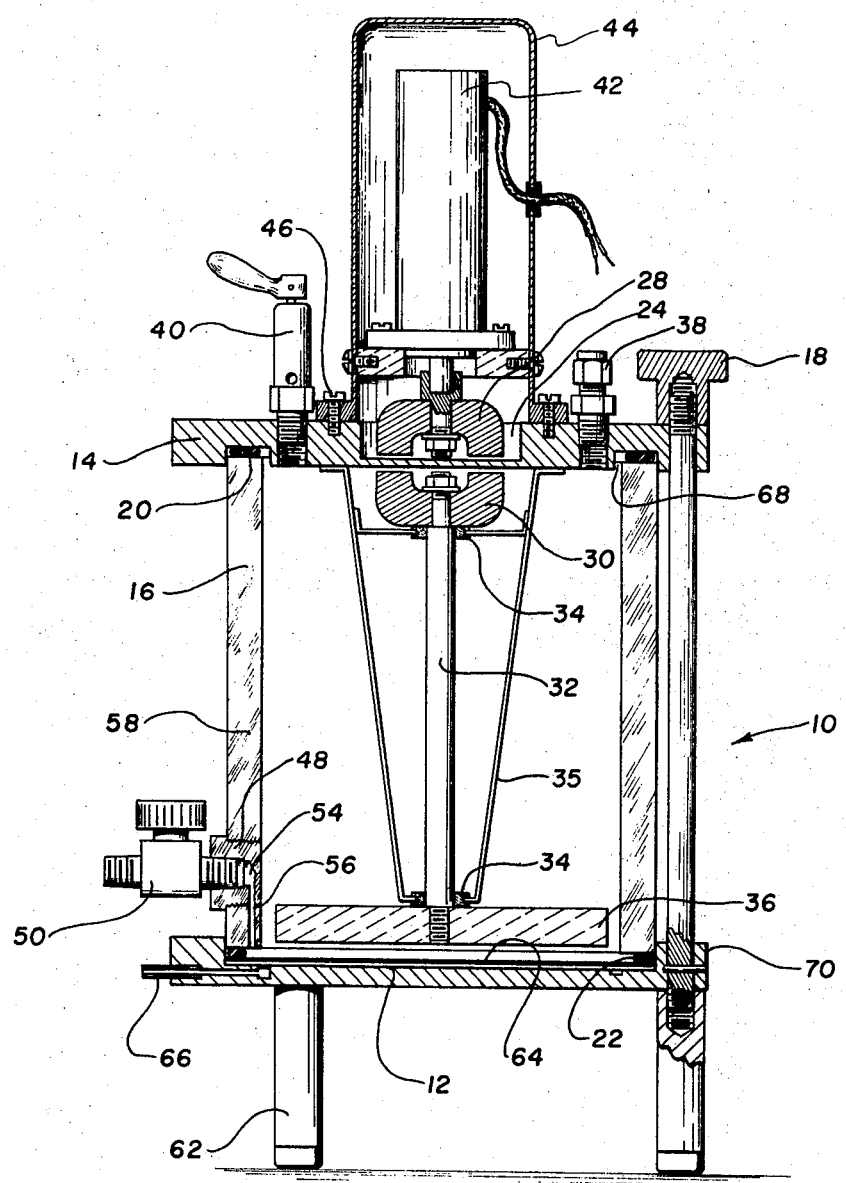
EDWARD A. AGRANAT
INVENTOR.
BY *Andrew F. Kehoe*
ATTORNEY

ULTRAFILTRATION BATCH CELL

BACKGROUND OF THE INVENTION

It has been a problem in the art to provide a larger laboratory batch ultrafiltration cell without compromising with the safety, economics, and performance standards associated with smaller cells. One problem associated with the use of larger cells derives from the frequent necessity of recovering any or all residual nonfiltered liquid therefrom without the need to disassemble the cell. These needs are accentuated because such cells are often used to concentrate solutions to various sequential concentration levels with a sample from each level to be tested and because the unit value of material being processed in the cell is often extremely high, e.g. a product of several weeks or months of research effort.

This high value of material also requires that the apparatus be disassembled with the least possible amount of loss of process fluid and be highly dependable with respect to the maintenance of operating parameters such as pressure level and the like.

SUMMARY OF THE INVENTION

Therefore, it is an object of the invention to provide a novel ultrafiltration cell having a convenient means to remove portions of unfiltered or concentrated solutions therefrom.

It is a further object of the invention to provide a novel ultrafiltration cell having an easily disconnectable agitation means which minimizes both the probability of losing process liquid on disassembly and the probability of significant pressurizing gas leakage.

Another object of the invention is to provide an ultrafiltration cell having convenient sample discharge means which eliminates the need to manipulate the cell while it is made heavy by process liquid contained therein.

Still another object of the invention is to provide a novel process for limiting the agitation of a solution being concentrated in said ultrafiltration cell by using electromagnetic clutch means.

Other objects of the invention will be obvious to those skilled in the art on reading the instant application.

These objects have been substantially achieved by construction of a ultrafiltration cell having an electromagnetic driving means for the mixer blade, said electromagnetic means consisting of an inner magnet mounted in said cell and an outer magnet mounted in register with the inner magnet so that they may rotate together. In order to provide a sufficiently thick top plate for the cell to provide pressure-containing connections therethrough, it has been found to be desirable to form a recess in the top plate in which one of the aforesaid magnets rotate.

Moreover, the apparatus of the invention has a novel means for removing unfiltered liquid from said cell without the necessity of removing the top plate therefrom and without the necessity of lifting or tipping the apparatus from the laboratory bench. This means comprises a vertical first conduit within a wall of said reservoir and a further conduit leading from said first conduit out through said valve. In the preferred embodiment of the invention, the wall of the reservoir rests on a compressed O-ring seal, the O-ring being smaller in thickness than the wall, thus providing passage means for the liquid contained within the cylinder to reach the aforesaid conduits.

ADVANTAGEOUS EXAMPLE OF THE APPARATUS

The FIG. is a section, partly schematic and in section, showing a novel batch filtration cell according to the instant invention.

Referring to the drawing, it is seen that ultrafiltration cell 10 comprises a bottom plate 12 and a top plate 14 with a cylinder 16 held therebetween to form a liquid reservoir 17. Plate 14, bottom plate 13, and cylinder 16 are held together by a series of six bolts 18 joining plates 14 and 12 and about the periphery thereof. Only one bolt 18 is shown in order to maintain the clarity of the drawing. A liquid seal is maintained between each of plates 14 and 16 and cylinder 16 by the compressive action of bolts 18 on O-ring seals 20 and 22.

Top plate 14 has a centrally-located recess 24 of relatively thin cross section 26 into which an outer horseshoe magnet 28 fits. On the bottom side of said plate, a second and inner horseshoe magnet 30 is mounted on a shaft 32 which shaft is in turn rotatably mounted in bearings 34 and held in place by bracket 35. Attached to the bottom of shaft 32 is a turbine mixer blade 36. Top plate 14 also includes a fluid inlet port 38, a pressure-relief valve 40. A motor 42 for driving horseshoe magnet 28, and mixer blade 36 through magnet 30 and shaft 32, is enclosed within motor cover 44 by fastening means 46. Motor cover 44 is connected directly to top plate 14.

A bushing 48 is inserted into an aperture in the side of cylinder 16. Into bushing 48 is placed a valve means 50. Valve 50 is not threaded entirely through bushing 48 and bushing 48 itself does not comprise an orifice which communicates with reservoir 17. Moreover, valve 50 does not protrude to the back of orifice 54, in bushing 48, but terminates leaving a portion of orifice 54 to form, with vertical channel 56 cut into the wall 58 of cylinder 16, a path for fluid to reach the stopcock from reservoir 17. It will be noted that O-ring 22 should be carefully selected in size to be smaller than the thickness of wall 58 so that it does not interfere with liquid flow into channel 56.

A supported membrane 64, e.g. an ultrafiltration membrane of the type sold under the trade designation DIAFLO by Amicon Corporation, is placed in the apparatus 10 and sealed between bottom plate 12 and O-ring 22. Filtrate is removed from cell 10 by means of a conduit 66 machined into bottom plate 12.

The preferred embodiments of the invention, O-ring seal number 20 and the upper edge of cylinder 16 are fitted into an annular channel 68 machined into the bottom face of top plate. O-ring seal 22 is compressed on the outside diameter against circumferential lip 70 of bottom plate 12.

The entire assembly is mounted on legs 62 which may, if desired be integral with bottom plate 12.

The operation of this apparatus is simple and will be obvious to those skilled in the art. However, a summary of its more salient advantages is set forth below:

a. Process fluid may be removed upstream of the membrane without removing the top of the cell by pressurizing the cell to drive out the liquid contained therein.

b. When the top of the cell is removed, there is no need to disconnect or remove the mixing means from the cell proper.

c. The outlet for removing the fluid described in (a) above is sufficiently high that there is no need to tip or lift the cell.

d. The electromagnetic mixer drive means has a relatively low torque cutoff point because of the clutchlike action of the magnet-to-magnet attractive forces. Thus by selecting magnets of low holding power and/or by selecting the gap between said magnets, it is possible to have the agitation stopped by throwing the magnets out of phase at a particular torque level which will be determined by the viscosity of the liquid being processed. There are several advantages to such a cut off:

1. it can act as a visual indication that a batch is "finished", e.g. concentrated to the desired level;
2. it can minimize the amount of mechanical abuse to which sensitive solutes are subjected; and
3. the cessation of mixing can be used as a signal to actuate signal or pressure control means, e.g. by the use of electric eyes or other motion-sensing devices.

I claim:

1. In a liquid filtration cell of the type having a removable top plate having a fluid inlet therein, a removable bottom plate having a fluid outlet therein, a liquid reservoir between said plates, and equipped with an agitation means, the improvement comprising:

a. said agitation means being equipped with an electromagnetic driving means consisting of an inner magnet mounted in said reservoir, an outer magnet mounted outside said reservoir, said outer magnet being connected to a motor means and said inner magnet being operably connected to a mixer blade; and b. means for removing unfiltered liquid from said cell comprising a vertical first conduit within a wall of said reservoir and a further conduit leading from said first conduit out through said wall.

2. A liquid filtration cell as defined in claim 1 wherein one said magnet is situated within a recess in a plate forming the top of said liquid filtration cell.

3. A liquid filtration cell as defined in claim 1 wherein said reservoir is a cylindrical reservoir sealed at either end thereof by contact under pressure with two O-ring seals, and wherein the lower O-ring seal is of reduced diameter with respect to the wall of said cylinder, thereby providing passage means for the communication of said vertical conduit with said reservoir.

4. A process for minimizing the agitation of a liquid solution being concentrated in a filtration batch cell of the type using a pair of magnets as clutch means between the motor and mixer blade comprising the steps of:

a. preselecting the gap between said magnets to cause the magnets to run out of phase with one another at a preselected torque exerted on the mixer blade; and b. concentrating said solution until the viscosity thereof causes said mixer blade to exert significant force to throw said magnets out of phase.